Oct. 3, 1950 — R. G. WOOLWORTH — 2,524,504
ANIMAL TRAP
Filed Feb. 14, 1945 — 3 Sheets-Sheet 1

INVENTOR.
RICHARD G. WOOLWORTH
BY Robert E. Burns
ATTORNEY.

Oct. 3, 1950     R. G. WOOLWORTH     2,524,504
ANIMAL TRAP
Filed Feb. 14, 1945                     3 Sheets-Sheet 2
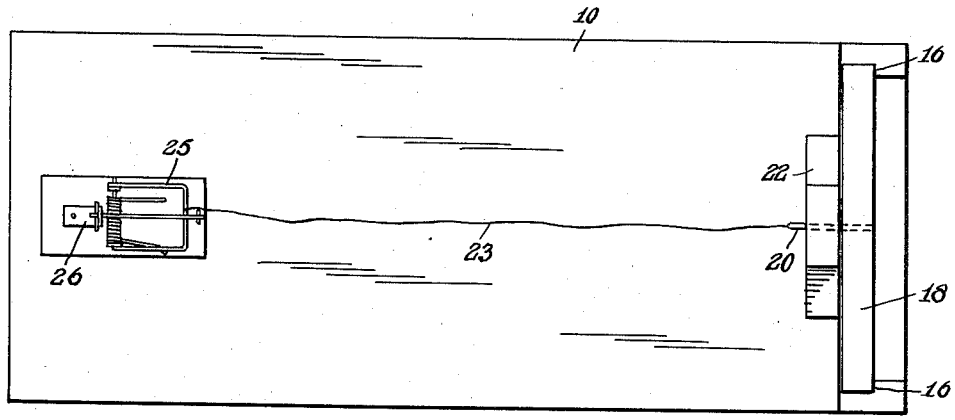
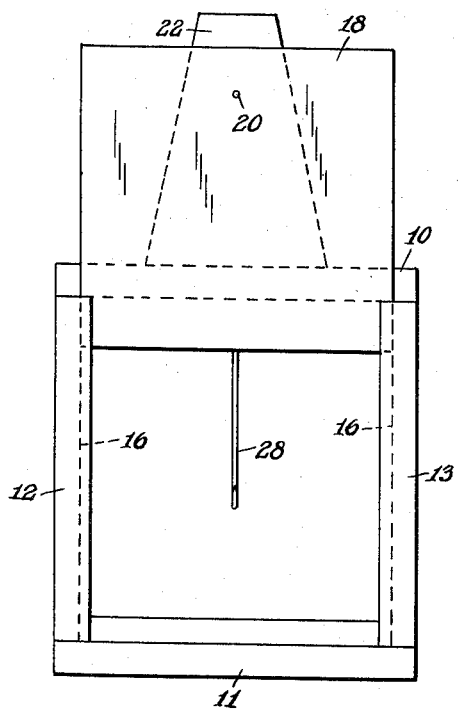
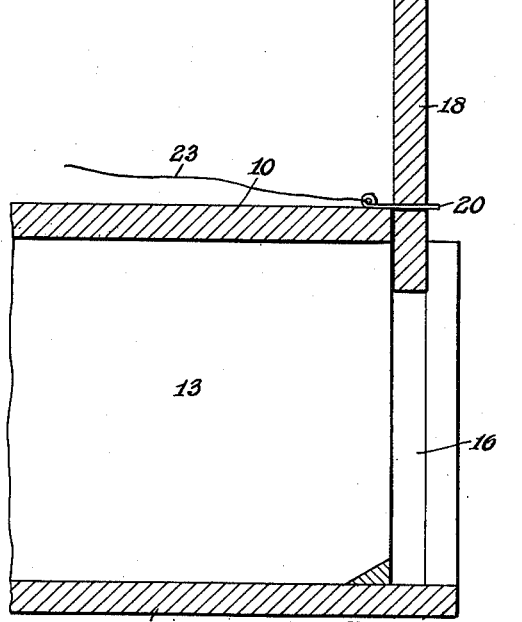
INVENTOR.
RICHARD G. WOOLWORTH
BY
ATTORNEY.

Oct. 3, 1950   R. G. WOOLWORTH   2,524,504
ANIMAL TRAP
Filed Feb. 14, 1945   3 Sheets-Sheet 3
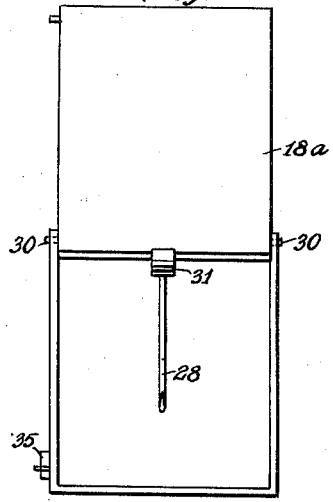
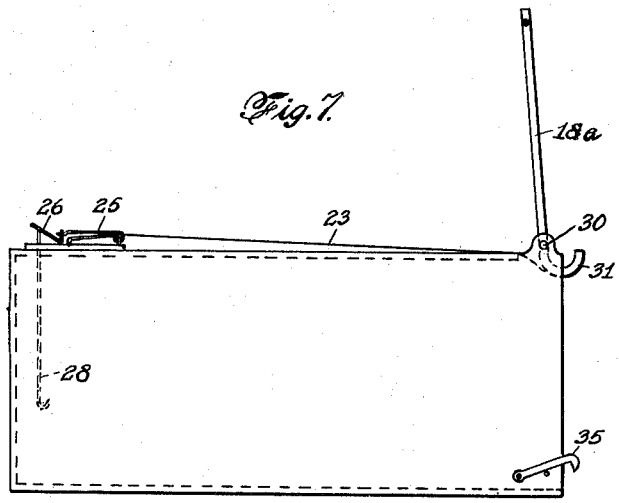
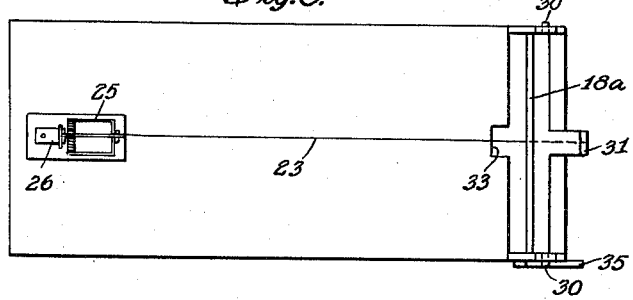
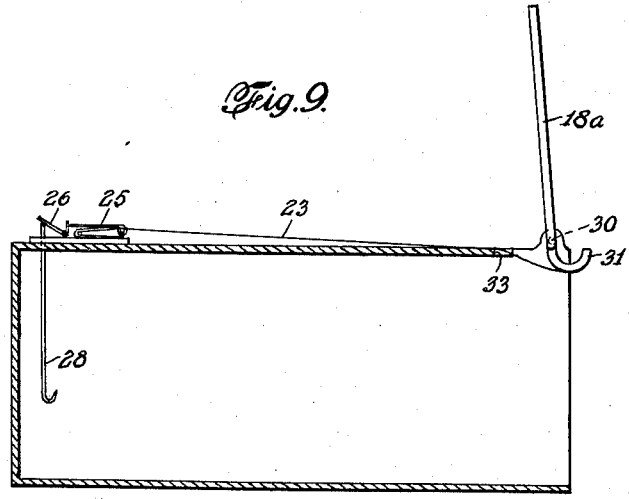
INVENTOR.
RICHARD G. WOOLWORTH
BY
Robert E. Burns
ATTORNEY.

Patented Oct. 3, 1950

2,524,504

UNITED STATES PATENT OFFICE 2,524,504

ANIMAL TRAP

Richard Grizwold Woolworth, Lancaster, Pa., assignor to Animal Trap Company of America, Lititz, Pa., a corporation of Pennsylvania Application February 14, 1945, Serial No. 577,836

8 Claims. (Cl. 43—61)

This invention relates to a box trap for rodents or other animals, in which the animal is to be taken alive, and particularly to a novel way of insuring that the trap will be closed quickly and surely after the animal has entered.

Box traps are well known and in general comprise a casing with sides, top and bottom of solid or screened material. At least one end is fitted with a door that may be closed quickly as it is allowed to fall through the effect of gravity. When the trap is set, the door is held open by mechanism including a tripping device within the casing. As the animal contacts the tripping device, it releases the door to fall of its own weight and close the opening to imprison the animal alive and unharmed. Such traps have been subject to certain disadvantages. One of these has been the difficulty of insuring that the door will be closed sufficiently quickly after entry of the animal. Furthermore, the animal itself had to provide the force by which the door was released, and if the bait was not moved with considerable force, the trap many times was not closed.

An object of the present invention is to provide a box trap in which the door releasing mechanism is merely triggered by the animal and then actuated by energy stored in it to cause the door to close. A further object of the invention is to provide a box trap of great sensitivity in which the animal need barely touch the bait to set in action the force by which the door is closed. An additional object is to provide a trap which although extremely sensitive may be easily set. Another object is to provide a spring loaded mechanism to effect the closing of the door and a member inside the box whose movement releases the spring. Still another object is to provide operating mechanism which functions positively and virtually instantaneously after it is set in motion.

Other objects and advantages of the invention will be apparent from the following specification and claims, and from the accompanying drawings which show by way of example several embodiments of my invention.

In the drawings:

Fig. 3 is a plan view of the trap.

Fig. 4 is an end view of the trap.

Fig. 5 is a fragmentary view similar to Fig. 1, and showing a modified construction.

Fig. 6 is an end elevation of a second modified form of my invention.

Fig. 7 is a side elevation of the modification shown in Fig. 6.

Fig. 8 is a plan view, and

Fig. 9 is a longitudinal section parallel to the plane of Fig. 7.

Figure 1:
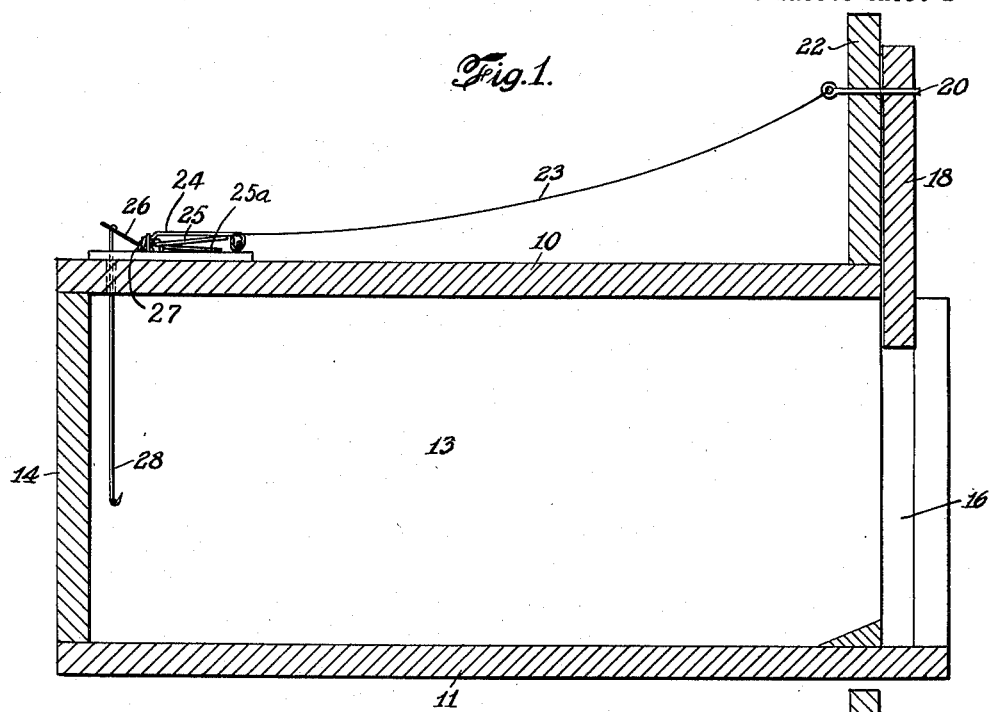
Fig. 1 is a longitudinal section through a trap embodying my invention, the door of the trap being shown open.

The box trap shown in Figs. 1 to 4 comprises a casing having a solid top 10, bottom 11 and sides 12 and 13. One end of the trap is closed by a fixed end wall 14. The other end of the box is open and at the opening there are provided opposing vertical slideways 16 open at the top.

Figure 2:
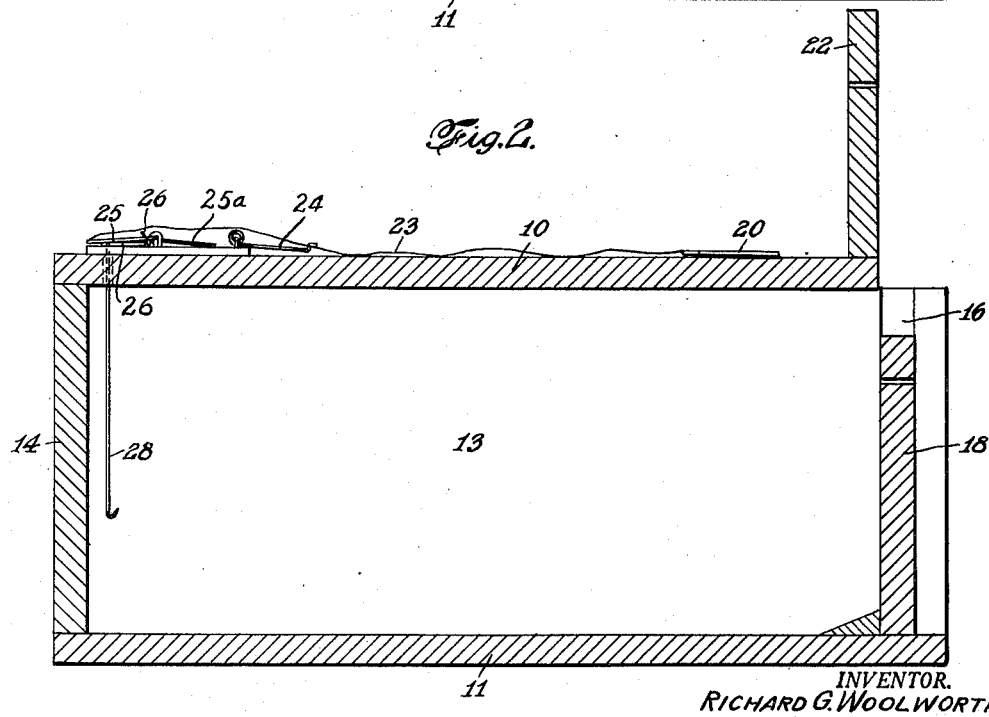
Fig. 2 is a similar section showing the door closed.

The trap is closed by a door 18 mounted in the slideways and adapted normally to drop to the position shown in Fig. 2. In this position of the door, the animal is imprisoned in the box until the door is opened manually.

When the trap is set for use the door is raised to the open position of Fig. 1, and held there by a pin 20 passing into an opening in it and through a similar opening in an upright post 22 secured to the casing.

The mechanism by which the pin is withdrawn and the door allowed to drop is mounted on the top 10. A cord 23 is fastened at one end to the pin, and at the other end to this mechanism. It is sufficiently long to provide a small amount of slack when in the position shown in Fig. 1.

As previously indicated, an object of the invention is to provide means for withdrawing the pin instantaneously and independently of the degree of force exerted by the animal on the tripping device within the box. To this end a quick-action spring-actuated snap member 25 forms the major part of the releasing mechanism and the cord 23 is fastened to it. A locking bar 24 is pivotally mounted on the top and at an end very near the pivot engages the member 25. A release pedal 26, held to the base by staple 27, engages the other end of the bar on the opposite side of the pivot and far enough from it to have leverage, requiring a small force to hold the member 25 down. Thus the release pedal 26 serves to hold the member 25 in a set position against a suitable spring 25a. An ordinary snap mousetrap in which the mousetrap bow corresponds to member 25, and the bait pedal 26, has been found to perform very well as part of the releasing mechanism. The locking bar performs the same function in each case.

The trap is sprung when the animal contacts a bait hook 28 hanging into the casing from the pedal 26 through an aperture in the top. The term "bait hook" is intended to mean any device carrying the bait by which the animal is attracted. As the animal attempts to take the bait it moves the pedal 26 to release the snap member 25 and permit it to snap from the position of Fig. 1 to the position of Fig. 2. This snapping movement applies a force to the cord 23 independent of the force which moved pedal 26, and jerks pin 20 out of the door 18. The door then drops and the animal is trapped.

To make the trap easier to pack, and reduce the volume of the package required, the modification of Fig. 5 is provided. In this construction all parts of the trap are like those of the construction of Figs. 1 to 4 except that post 22 is eliminated. The pin 20 thus engages door 18 at a different point and bears against the top 10 to hold the door in its open position. This modification functions exactly as the construction of Figs. 1 to 4 where the pin is jerked from the door to allow it to drop to a closed position.

A further modification of my invention is shown in Figs. 6 through 9. In this trap, the door 18a is pivotally connected to the casing, being shown hinged at 30 to the top 10. In its set position, the door tilts to the left of the vertical a small amount as shown in Fig. 7. The limit to which it tilts is governed by any suitable stop on the casing. The door may be hinged at the side or at the bottom, and a spring provided instead of gravity to close the door. The spring then would be released by action of the snap member 25.

That end of the door 18a which is closest the top is formed with an arcuate portion 31, as shown. The cord 23 passes into the casing through a slot 33 in the cover 10 to extend around and be secured at the end of the portion 31.

As the snap member 25 is released by pedal 26 to swing to the left (Fig. 7), the cord pulls on the door 18a to rock it clockwise toward closed position. It will be seen that as soon as the door swings past the vertical it will be acted on by gravity to swing it closed. To retain the door closed against any pushing by the animal, a drop switch 35 carried by the casing is cammed up as the door falls to drop behind a pin on the door 18a (Fig. 7).

From the foregoing description it will be seen that I have provided a box trap which is substantially instantaneous in action, and in which the door releasing force is not dependent on the force applied by the animal to the bait hook 28. The trap is simple to set, as it is possible during the setting operation to have sufficient slack in the cord 23 to relieve all tension caused by either the member 25 or the required position of the pin 20.

Having described my invention, what I claim is:

1. In a box trap of the type described, a casing with an opening therein for entry of the animal, a door adapted to be dropped to close said opening, a spring-loaded quick-action snap member mounted on said casing, means including a pedal member to retain said snap member in a cocked position, a bait hook inside said casing connected to said pedal member to shift the same and release said snap member, a pin adapted to bear against said casing and extend into said door to retain it in a raised position, and a cord connecting said pin to said snap member to withdraw said pin from said door to allow the same to drop when said snap member is released by said pedal.

2. In a box trap of the type described, a casing with an opening in an end thereof for entry of an animal, a door rotatably mounted on said casing adjacent the top of said opening and adapted to be dropped to close said opening, a spring-loaded quick-action snap member mounted on said casing, means including a pedal member to retain said snap member in a cocked position, a bait hook inside said casing connected to said pedal member to shift the same and release said snap member, a cord connecting said door and said snap member to rotate said door and allow the same to drop when said snap member is released by said pedal, and a latch to engage said door as it drops and hold it in a closed position.

3. In a box trap of the type described, a casing with an opening in an end thereof for entry of an animal, a door rotatably mounted on said casing adjacent the top of said opening and adapted to be dropped to close said opening, a spring-loaded quick-action snap member mounted on the top exterior surface of said casing, means including a pedal member to retain said snap member in a cocked position, a bait hook inside said casing connected to said pedal member to shift the same and release said snap member, and a cord connecting said door and snap member to rotate said door and allow the same to drop when said snap member is released by said pedal.

4. In a box trap of the type described, a casing with an opening therein for entry of an animal, a door associated with said casing and movable to open and close said opening, said door being biased to move to closed position, a detent for releasably holding the door in open position against the action of the bias, a mouse trap mounted on said casing, said mouse trap comprising a base, a jaw pivotally mounted on the base for movement between set and sprung positions, a spring for swinging the jaw from set to sprung position and mechanism including a locking bar and bait pedal for releasably holding the jaw in set position, a bait hook operatively connected with said bait pedal and having a portion disposed inside of the casing, and a cord connecting the jaw with said detent, the mouse trap, bait hook and cord being so arranged that actuation of the bait hook by an animal in the casing springs the mousetrap whereupon movement of the mousetrap jaw acts through the cord to withdraw the detent and thereby release the door to close the casing.

5. In a box trap of the type described, a casing with an opening therein for entry of an animal, a door associated with said casing and movable to open and close said opening, a mouse trap mounted on said casing, said mouse trap comprising a base, a jaw pivotally mounted on the base for movement between set and sprung positions, a spring for swinging the jaw from set to sprung position and mechanism including a locking bar and bait pedal for releasably holding the jaw in set position, a bait hook operatively connected with said bait pedal and having a portion disposed inside the casing, and operable connections between the jaw of the mouse trap and the door to cause a closing of the door when the mouse trap is sprung.

6. In a box trap of the type described, a casing with an opening therein for entry of an animal, a door associated with said casing and movable to open and close said opening, said door being biased to move to closed position, a detent for releasably holding the door in open position against the action of the bias and actuating means on the casing for withdrawing said detent comprising, a base portion, a jaw member pivotally mounted on the base for movement between set position and sprung position, a spring for swinging the jaw from set to sprung position, and mechanism including a locking bar and a bait pedal for releasably holding the jaw in set position, a bait hook operatively connected with said bait pedal and having a portion disposed inside the casing, and a cord connecting the jaw with said detent and operable to withdraw said detent to release the door upon movement of the jaw from set to sprung position.

7. A trap comprising a cage, a vertically slidable door at one end of the cage movable by gravity vertically normally to closed position, means for locking the door in an elevated position against downward movement, a trigger device mounted on top of the cage and operatively connected to said locking means and including a flat base, a spring actuated U-shaped jaw, an arm and a keeper, said jaw, arm and keeper all being mounted on said base, and a movable device within the cage suspended from the keeper of the trigger device on top of the cage to normally maintain the trigger device set and upon forced movement of said movable device actuate the trigger device to actuate the keeper, said arm and said jaw to release the locking means and permit the door to move downwardly under its own weight to closed position.

8. A trap comprising a cage, a door movable to open and close the cage, and movable normally to closed position, a locking means for locking engagement with the door to hold it in open position, operating means connected to said locking means, to move the locking means out of locking engagement with the door to permit the latter to close, said operating means including a keeper, and a floating member suspended in the cage from said keeper and movable upon floating movement of the floating member to actuate the said keeper of said operating means to release the said lock operating means to withdraw the locking means from locking engagement with the door.

RICHARD GRIZWOLD WOOLWORTH.

REFERENCES CITED

The following references are of record in the file of this patent:

UNITED STATES PATENTS

| Number | Name | Date |
|---|---|---|
| 74,264 | Zaiser | Feb. 11, 1868 |
| 166,802 | Oliver | Aug. 17, 1875 |
| 253,907 | Andre | Feb. 21, 1882 |
| 443,975 | Pead | Dec. 30, 1890 |
| 1,028,633 | Swanson | June 4, 1912 |
| 1,382,416 | Dresser | June 21, 1921 |